Patented Jan. 22, 1952

2,583,356

UNITED STATES PATENT OFFICE 2,583,356

PHOSPHORYL COMPOUNDS OF ESTER SUBSTITUTED ALCOHOLS

William F. Brucksch, Jr., Bethany, and Louis H. Howland, Watertown, Conn., assignors to United States Rubber Company, New York, N. Y., a corporation of New Jersey No Drawing. Application December 31, 1947, Serial No. 795,120

5 Claims. (Cl. 260—461)

An object is to prepare chemicals which are capable of curing to highly cross-linked polymers which exhibit insolubility and infusibility in conjunction with a high degree of chemical resistance. A further object is to prepare certain polymerizable chemicals which may be polymerized alone or with unsaturated co-reactive ethylenic compounds to form resins having increased resistance to burning. Another object is to provide certain liquid polymerizable phosphorus-containing resins which may be used for impregnating various textile fabrics, or paper, or other substrate, of vegetable or mineral origin, e. g., cotton, asbestos, glass cloth, or mixtures of such, to form strong, light-weight, fire-resistant sheets or laminates. Further objects will be apparent from the hereinafter description.

The new products may be defined as phosphoryl compounds of ester substituted alcohols, wherein the phosphoryl radical

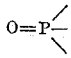

is joined to oxygen of a hydroxy group of the ester-alcohol. Where less than three of the said free valences are so joined, the remaining mono-valences numbering from one to two are attached to —OH, —O-alkyl, or —O-alkenyl groups.

The ester substituted alcohol corresponds to the general formula

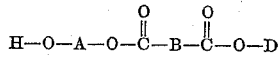

where A is an alkylene group $C_nH_{2n}$ where $n$ may vary from 2 to 5, or —$CH_2$—$CH_2$—($OCH_2CH_2$)$_m$— where $m$ is 1 to 2; B is the residue of an alpha-unsaturated dicarboxylic acid; and D is hydrogen or a hydrocarbon group. The unsaturation of the dicarboxylic acid may be cis or trans. Its acid value may range from 40 to 350 depending on the particular ester-alcohol used and its particular manner of preparation.

Examples of such ester substituted alcohols derived from dihydric alcohols, including ethylene glycol and the polyethylene glycols are:

(1) Ethylene glycol mono-ester of maleic acid;
(2) Diethylene glycol mono-ester of maleic acid;
(3) Ethylene glycol mono-ester of fumaric acid;
(4) Diethylene glycol mono-ester of fumaric acid;
(5) Ethylene glycol monoester of chloromaleic acid;
(6) Diethylene glycol mono-ester of chloromaleic acid;
(7) Ethylene glycol mono-ester of itaconic acid;
(8) Diethylene glycol mono-ester of itaconic acid;
(9) Ethylene glycol mono-ester of citraconic acid;
(10) Diethylene glycol mono-ester of citraconic acid;
(11) Propylene glycol mono-ester of maleic acid;
(12) Propylene glycol mono-ester of fumaric acid;
(13) Propylene glycol mono-ester of itaconic acid;
(14) Propylene glycol mono-ester of citraconic acid;
(15) Propylene glycol mono-ester of chloromaleic acid;
(16) Trimethylene glycol mono-ester of maleic acid; and the corresponding mono-esters of the fumaric, chloromaleic, citraconic, and mesaconic acids, respectively;
(17) Tetramethylene glycol mono-ester of maleic acid; and the corresponding mono-esters of the fumaric, chloromaleic, mesaconic, and citraconic acids, respectively;
(18) Butylene glycol mono-ester of maleic acid; and the corresponding mono-esters of the fumaric, chloromaleic, mesaconic, and citraconic acids, respectively;
(19) 2,2-dimethyl-propylene glycol mono-ester of maleic acid; and the corresponding mono-esters of the fumaric, chloromaleic, mesaconic, and citraconic acids, respectively;
(20) Allyl beta-hydroxyethyl maleate;
(21) Methyl beta-hydroxyethyl maleate;
(22) Beta-chloroallyl beta'-hydroxy ethyl maleate;
(23) Allyl gamma-hydroxypropyl maleate;
(24) Allyl delta-hydroxybutyl maleate;
(25) Allyl epsilon-hydroxyamyl maleate;
(26) Allyl ester of diethylene glycol monomaleate;
(27) Allyl ester of triethylene glycol monomaleate;
(28) Allyl beta-hydroxyethyl fumarate;
(29) Allyl beta-hydroxyethyl itaconate;
(30) Allyl beta-hydroxyethyl citraconate;
(31) Allyl beta-hydroxyethyl mesaconate;
(32) Triethylene glycol mono-ester of maleic acid;
(33) Pentamethylene glycol mono-ester of maleic acid.

The reaction with $POCl_3$ is illustrated as follows using the ester-alcohol, allyl beta-hydroxyethyl maleate as a reagent:

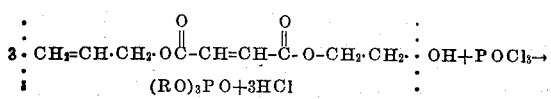

R is the group between the dotted lines. The formation of such a neutral ester is accompanied by the formation of minor amounts of a side-reaction product produced by reaction of by-product hydrogen chloride with the neutral ester to form a phosphorus-containing ester containing some of the chemicals corresponding to the formula

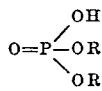

according to the equation

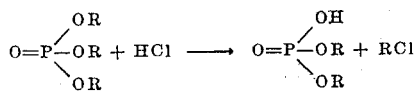

The most preferred and outstanding chemically-resistant resins are those derived from reacting phosphoryl chloride with allyl beta-hydroxyethyl maleate, which is derived from maleic acid or its anhydride, ethylene glycol, and allyl alcohol. The resulting phosphorus-containing chemical is homopolymerizable, as well as copolymerizable with various types of co-reactive ethylenic compounds, as illustrated (but without limitation thereto), by copolymerization with diallyl fumarate, styrene, 2,4-dichlorostyrene, 2,5-dichlorostyrene. Such polymerizations can be expedited by actinic light, or heat, and with any of the conventional peroxidic catalysts, including benzoyl peroxide, acetyl peroxide, tertiary butyl hydrogen peroxide, etc.

The uncured (unpolymerized) compositions are particularly suited as liquid impregnants for cloth, paper, or other substrate, in the manufacture of laminar structures. Desirable viscosities for such a purpose are in the range of 1 to 100 poises, the preferred range being from 2 to 20 poises at ordinary room temperature, remembering that the material should not be so fluid as to drain from the cloth, etc., nor so viscous that insufficient wetting results, although higher viscosities are within the scope of the invention.

The monomeric reaction product from reaction with POCl₃ can be homopolymerized to form a polymer which has the characteristics of insolubility, infusibility, chemical resistance, and fire resistance.

The uncured compositions can be synthesized in a variety of ways; among them are:

1. The ester substituted alcohol is condensed with phosphorus oxychloride.
2. One mol of phosphorus oxychloride is first condensed with three mols of a glycol and the remaining hydroxyl groups thereon reacted with a dibasic acid or its monoester.
3. The dibasic acid is first half-esterified with the glycol and thereafter reacted with the monohydric alcohol prior to reaction with the phosphorus oxychloride.
4. The dibasic acid is first half-esterified with the monohydric alcohol and thereafter condensed with first the glycol and, secondly, with phosphorus oxychloride.
5. The dibasic acid, the glycol, and the monohydric alcohol are mixed initially and condensed to the desired ester alcohol, then reacted with phosphorus oxychloride.

Generally, the molar proportions of the reactants that are used range from 0.1 to 1.0 mole of the POCl₃ for each molar proportion, by weight, of the ester-alcohol used.

A preferred method of manufacture involves the stepwise synthesis of the ester-alcohol followed by condensation with phosphorus oxychloride. It is preferable to synthesize the glycol-ester first, by heating together single equivalent amounts of the alpha, beta-unsaturated dicarboxylic acid and the dihydric alcohol. This reaction is comparatively rapid. Thereafter, the other carboxylic acid radical is esterified by the desired monohydric alcohol. It is preferable to conduct this reaction at or near the boiling temperature of the monohydric alcohol to minimize alcoholysis. It is convenient to perform such reactions in an azeotropic solvent, such as benzene, toluene, ethylene dichloride, etc., and in the presence of an acidic esterification catalyst such as sulfuric acid, hydrochloric acid, p-toluene sulfonic acid, etc. When using oxidation catalysts it is preferable to neutralize the catalyst after termination of the reaction, to lessen the danger of forming a darkened product. With catalysts such as sulfuric acid or p-toluene sulfonic acid, neutralization may be effected by alcoholic sodium or potassium hydroxide. Hydroquinone may be added in quantities up to 200 parts per million of ester, at this point, to minimize the possibility of gel formation during subsequent treatment. An azeotropic distillation is conducted preferably at atmospheric pressure to remove as much free allyl alcohol as possible before processing is continued.

Reaction of the organic-ester-alcohol with phosphorous oxychloride is best conducted at temperatures at or near 5° C.–20° C., although higher or lower operating temperatures may be used. If desirable, one can conduct the phosphorylation in a stream of inert gas, e. g., carbon dioxide, nitrogen, etc., to facilitate removal of by-product hydrogen chloride. The use of metals or metallic halides as dehydrohalogenation catalysts may be advantageous. Metal chlorides such as the chlorides of calcium, magnesium, aluminum, iron or zinc may be used. These may be introduced as such or the free metal may be used whereby the chloride is formed in situ.

To minimize the degree of secondary reactions on POCl₃ addition, it is preferable to avoid elevated temperatures, above 30° C. Higher yields of tri-substituted phosphate may be obtained by prolonged reaction periods at temperatures near 10° C. It is desirable to pass a stream of chemically unreactive gas through the phosphorylated ester during this period to act as a carrying agent for residual hydrogen chloride. Ethylene oxide, nitrogen and carbon dioxide may be used.

Further, hydrogen chloride may be removed along with any available volatile constituents by the application of reduced pressure and heat after the prolonged low temperature reaction period. It is also desirable to pass a stream of one of the previously mentioned gases through the reaction mixture during this vacuum treatment.

The ester-alcohol may be diluted, if desired, with an inert hydrocarbon solvent such as toluene, xylene, or benzene, before the phosphorous oxychloride is added to the mixture, otherwise the exothermic nature of the reaction may increase the viscosity of the solution to such an extent that adequate stirring and the evolution of hydrogen chloride are difficult.

Too severe a heat treatment may cause the monomer to thicken beyond the useful range, and for this reason temperatures in excess of 140° C. are not recommended.

The following examples are given to illustrate the invention, the apparatus used constituting a three-necked flask equipped with a stirrer, reflux condenser, thermometer, and an inlet tube for blanket gas:

EXAMPLE 1

Maleic anhydride (2.0 mols) and 2.0 mols of ethylene glycol are combined with stirring, at 110° C. for two hours, using a continuous stream of carbon dioxide gas as a protective inert gas. The acid ester forms in nearly quantitative yield without evolution of any water. The product is cooled to room temperature and is a clear liquid of light color and low viscosity. $POCl_3$ (0.67 mol) is then added to the acid ester over a half hour period at a temperature maintained at 20° C.–30° C. by applied refrigeration using care to avoid freezing the reactants. A steady stream of $CO_2$ is passed through the mix during the phosphorylation. The ester gradually increases in viscosity and the product is a white, acidic, non-pouring cream. Analysis: 4.94% phosphorus; 13.43% chlorine; saponification number—914.

The acid phosphoric ester (7 grams) is mixed with triallyl phosphate (3 grams) to be copolymerized therewith. Benzoyl peroxide catalyst (3% based on the weight of the monomers) is added. The liquid mix is used to impregnate two layers of glass cloth which are pressed together and the resin impregnated laminate cured at 110° C. for thirty minutes. The laminate is a stiff, transparent, light-colored sheet which shows excellent resistance to burning. The cure may be varied to give similar results, e. g., by curing at 125° C. for one half hour using 1.5% benzoyl peroxide as catalyst.

EXAMPLE 2

Maleic anhydride (3.0 mols) and 3.0 mols ethyl alcohol are refluxed for one and one half hours at 80° C. with no evolution of water. To the intermediate, ethyl acid-maleate, 3.0 mols of ethylene glycol is added. The flask is then fittted with a condenser for downward distillation. The reactants are heated at 140° C. for two and one half hours with the evolution of water to give ethyl beta-hydroxy-ethyl maleate as a pale amber colored liquid.

The reaction product is treated with 1.0 mol of phosphorus oxychloride, added dropwise at a temperature of 20° C.–30° C., over a period of one hour, in the presence of a blanket of carbon dioxide gas. The product is a clear, nearly water-white liquid of acidic odor. This material is subjected to treatment at 100° C. under reduced pressure (50 mm. Hg) for a period of one hour, in the presence of a stream of carbon dioxide.

This product, and the product used in laminates 3, 4 and 5 prepared as described below (all termed "Monomer" in the following Table I) is mixed with the variously denoted comonomers and the liquid mix containing benzoyl peroxide catalyst, used for impregnating two layers of glass cloth, with the results stated.

Laminates 3, 4 and 5 are prepared from a phosphate ester which had been treated for an additional period of three hours at 120° C. at a pressure of 40 mm. Hg. During treatment, both ethyl alcohol and HCl were evolved. This improved product for laminates 3–5 had the following analysis:

C=39.74%
H=4.75%
P=4.4%
Cl=11.9%
Acid value=198

EXAMPLE 3

Maleic anhydride (4.0 mols) and 4.0 mols of allyl alcohol are refluxed at 137° C. for fifteen hours. The product is an amber colored liquid.

Ethylene glycol (4.0 mols) is added, and the contents are heated at 130° C.–140° C. until 104 cc. of condensate are collected (mixture is mostly water with some allyl alcohol). The ester-alcohol is a clear, pale amber color and of low viscosity.

To the ester-alcohol is then added 179 grams of $POCl_3$ in the manner shown in Example 2, and in the presence of a $CO_2$ stream. The phosphorylation reaction is carried out at 20° C.

The resulting phosphoric ester gave the following analysis:

C=40.2%
H=5.1%
P=4.4%
Cl=11.2%
Acetyl No.=30
Acid No.=196
Sap. No.=795
Iodine No.=69

This product is divided into 2 parts for subsequent treatment, Example 3 (A) and Example 3 (B).

EXAMPLE 3 (A)

One portion is vacuum treated at 100° C. for one hour at 4 mm. Hg pressure. The product is a clear amber liquid, with a viscosity of 6 poises at room temperature which is ideal for impregnating operations. The product analyzed:

C=40.8%
H=5.1%
P=4.7%
Cl=9.5%
Acetyl No.=Negative
Acid No.=174
Sap. No.=830
Iodine No.=64

This product (termed "Monomer" in the following Table II) is mixed with the variously de-

*Table I*

| Laminate No. | Monomer Per Cent | Comonomer | Per Cent | Catalyst Per Cent | Curing Temp., °C. | Curing Time, Hrs. | Laminate | Burning Quality |
|---|---|---|---|---|---|---|---|---|
| 1 | 67 | Styrene | 33 | 5 | 120 | 1.0 | Darkened during cure. | Not self-extinguishing. |
| 2 | 75 | Triallyl-phosphate. | 25 | 5 | 120 | 1.0 | ___do___ | Self-extinguishing. |
| 3 | 70 | ___do___ | 30 | 3 | 125 | 0.8 | Stiff white product. | Readily self-extinguishing. |
| 4 | 70 | ___do___ | 30 | 1.5 | 125 | 0.5 | ___do___ | Do. |
| 5 | 70 | Styrene | 30 | 1.5 | 125 | 0.5 | ___do___ | Burns slowly. | noted comonomers, and the liquid mix containing benzoyl peroxide catalyst, is used for impregnating two layers of glass cloth, with the results stated.

reaction mixture is subjected to vacuum to exhaust by-product HCl.

The ester copolymerizes readily with styrene to form products which are resistant to burning.

*Table II*

| Laminate No. | Monomer Per Cent | Comonomer | Per Cent | Catalyst Per Cent | Curing Temp., °C. | Curing Time, Hrs. | Laminate | Burning Quality |
|---|---|---|---|---|---|---|---|---|
| 6 | 70 | Triallyl phosphate. | 30 | 3.0 | 135 | 0.5 | Hard white Laminate. | Self-extinguishing. |
| 7 | 70 | Styrene | 30 | 3.0 | 130 | 0.5 | Lightly stained hard resin. | Burns slowly. |
| 8 | 100 | | | 3.0 | 120 | 0.5 | Light colored stiff laminate. | Readily self-extinguishing. |
| 9 | ¹100 | | | 1.5 | 125 | 1.0 | Very light color Stiff good cure. | Do. |

¹ 10 drops of a base (ethanolamine) per 10 grams of catalyzed resin added to overcome the acidity of the product.

EXAMPLE 3 (B)

This portion is vacuum treated in a similar manner as in Example 3 (A), for three hours at 160° C. During the treatment the product becomes cloudy and more viscous, and the odor is characteristic of phosphorus compounds on decomposition. The color also deepens during the heating period. The product analyzed:

C=45.3%
H=4.9%
P=4.9%
Cl=8.9%
Acetyl No.=negative.
Acid No.=179
Sap. No.=861
Iodine No.=56

This product (termed "Monomer" in the following Table III) is mixed with benzoyl peroxide catalyst, and is used for impregnating two layers of glass cloth, with the results stated.

EXAMPLE 5

Maleic anhydride (4.0 mols) is refluxed with 4.0 mols of allyl alcohol at 135° C. for nineteen hours. The material consists of a liquid portion which is light amber and clear, and an amount of a white crystalline precipitate, probably allyl acid-fumarate. To this mix is added 4.0 mols of ethylene glycol, and the mix heated at 135° C., with stirring, for three hours, using a blanket of carbon dioxide. Judging from the condensate, about 4.0% of the original allyl alcohol added originally is lost by evaporation. The final ester is a perfectly clear pale amber-colored liquid. To this liquid 1.28 mols of phosphorus oxychloride is added dropwise with stirring, in a carbon dioxide stream, while the temperature is maintained at 20° C. The resulting product is subjected to vacuum treatment, for one hour at 140° C. at 40 mm. Hg. The product is a pale greenish-yellow liquid, analyzing:

*Table III*

| Laminate No. | Monomer, Per Cent | Per Cent Bz₂O₂ Catalyst | Curing Time, Hrs. | Curing Temp., °C. | Appearance of Laminate | Burning Rate of Laminate |
|---|---|---|---|---|---|---|
| 10 | 100 | 3.0 | 1.0 | 110 | Stiff discolored light brown. | Quickly self-extinguishing. |
| 11 | ¹100 | 1.5 | 0.5 | 125 | Rigid light color stiff. | Do. |
| 12 | 100 | 1.5 | 1.5 | 110 | Stiff discolored light brown. | Do. |

¹ To control the development of color during cure, 10 drops of ethanolamine are added to the 10 gram portion of catalyzed monomer.

EXAMPLE 4

Maleic anhydride (4.0 mols) and 4.0 mols of n-butanol, are refluxed for fifteen hours, giving a product which is a light amber fluid. After addition of 4.0 mols of ethylene glycol, the flask is fitted for distillation with a take-off trap for condensate. Esterification is carried out at 135° C., giving butyl beta-hydroxy-ethyl maleate, a clear light-colored material. To this is added 0.67 mol of POCl₃ dropwise with stirring, during which the temperature rises to about 80° C. The P=4.9%
Cl=8.9%
Acetyl No.=negative
Acid No.=190
Sap. No.=859

Two-ply laminates are prepared using glass cloth, in the aforesaid manner, by impregnation and curing with the product of Example 5 liquid, using benzoyl peroxide catalyst, the cures being carried out in the presence of various added organic bases. The results are shown in Table IV.

Table IV

| No. | Per Cent Catalyst | Hrs. | Temp., °C. | Addend | Drops/10 Gms. | Cure | Color |
|---|---|---|---|---|---|---|---|
| 13 | 3.0 | 0.5 | 125 | | | Stiff | Light brown. |
| 14 | 1.5 | 0.5 | 125 | | | ...do | Do. |
| 15 | 1.5 | 0.5 | 125 | Di-N-octylamine | 5 | ...do | Very light brown. |
| 16 | 1.5 | 0.5 | 125 | Diethanolamine | 20 | ...do | White. |
| 17 | 1.5 | 0.5 | 125 | Triethanolamine | 20 | ...do | Do. |
| 18 | 1.5 | 0.5 | 125 | Ethanolamine | 20 | ...do | Very light yellow. |
| 19 | 1.5 | 0.5 | 125 | ...do | 10 | ...do | Do. |
| 20 | 1.5 | 0.5 | 125 | ...do | 5 | ...do | Light tan. |
| 21 | 1.5 | 0.5 | 125 | Pyridine | 20 | Undercured. | Very light tan. |

EXAMPLE 6

Maleic anhydride (4.0 mols) is mixed with 4.0 mols of allyl alcohol and 12 drops of phosphoric acid which is present to improve the color. The mixture is refluxed at 135° C. for two hours, then 4.0 mols of ethylene glycol is added. The flask fittings are changed over for distillation, and an inert atmosphere ($CO_2$) is maintained, while the solution is heated for three hours to a maximum temperature of 140° C. Water and allyl alcohol are removed as condensate. Phosphorus oxychloride (161 g.) is added to the flask, at 10–15° C., reaction being carried out for eight hours. This is followed by vacuum treatment for one hour at 50° C.–60° C., producing a clear, nearly water-white liquid (55 poises viscosity at 25° C.), analyzing:

C=42.8%
H=4.6%
P=4.7%
Cl=8.0%
Acetyl No.=negative
Acid No.=155
Sap. No.=818
Viscosity=22.6

Glass cloth laminates were prepared, curing being with and without the presence of organic bases with the following results in Table V.

EXAMPLE 7

This example shows a reversal of steps in preparing the ester substituted alcohol.

Condensation of maleic anhydride with ethylene glycol to form the acid-ester is rapid at 100° C. Thereafter, the allyl alcohol can be esterified with the acid maleate without danger of alcoholysis. It is possible where allyl alcohol is first condensed with maleic anhydride and the glycol reacted later, particularly above 130° C., to cause a counter-current alcoholysis of the allyl alcohol unit from the maleate, in exchange for ethylene glycol, which is less volatile.

According, 4.0 mols of maleic anhydride are reacted with 4.0 mols of ethylene glycol at 110° C. for one quarter hour. The acid value is 344, in contrast to the theoretical value for mono acid maleate of 351. The ester is a pale clear liquid of low viscosity. To it are added 8.0 mols of allyl alcohol, an excess of 100%, 700 cc. of benzene, and 10 grams of p-toluene sulfonic acid as an esterification catalyst. Azeotropic distillation of water is conducted for a period of eight hours at a temperature of 76° C.–90° C. The vapor is condensed in a trap for the separation of the water-alcohol lower layer, the upper liquid layer of benzene-alcohol being constantly recirculated. At the end of the heating period, 96.8% of the theoretical quantity of water (4.0 mols) has been

Table V

| Laminate No. | Catalyst, Per Cent Bz₂O₂ | Time, Hrs. | Temp., °C. | Addend | Drops/ 10 Gms. | Characteristics of Laminate | Burning of Laminates |
|---|---|---|---|---|---|---|---|
| 22 | 1.5 | 0.5 | 130 | | | Undercured, white, many voids. | Instantly self-extinguishing. |
| 23 | 3.0 | 0.5 | 130 | Ethanolamine | 5 | Undercured, pale yellow, little better than (22). | Do. |
| 24 | 3.0 | 1.0 | 140 | Tri-n-butylamine | 5 | Slightly undercured; nearly white, fairly hard. | Do. |
| ¹25 | 1.5 | 0.5 | 125 | | | No discoloration. Hard, stiff, white. | Do. |
| ¹26 | 1.5 | 0.5 | 125 | Tri-m-butylamine | 5 | Good cure. Hard, stiff, pale, amber. | Do. |

¹ After second thermal treatment.

The "second thermal vacuum treatment" means that the phosphorus-containing product of Example 6 is additionally vacuated for two hours at 90° C.–130° C., using a pressure of 20 mm. Hg. The clear, colorless more viscous product (23 poises at 25° C.) when used for preparation of laminates 25 and 26, shows better results. This shows the advantage of improving, in certain cases, the reaction product, by additional vacuum thermal treatment.

evolved as a solution containing 16% of allyl alcohol. The excess allyl alcohol and benzene are then removed by simple distillation. Since some of the allyl alcohol has come over with the water condensate, it is necessary to adjust the phosphorus oxychloride amount to 102 cc. rather than the theoretical 122 cc. which is added dropwise at a temperature of 10° C.–20° C. over a period of one hour. The product is a light-colored fluid resin. Vacuum treatment did not alter the appearance of the material which has an acid No. of 114.

EXAMPLE 8

Step I.—Maleic anhydride (4.0 mols) is placed in a three-necked flask, equipped with a stirrer, a reflux condenser, a thermometer, and a carbon dioxide inlet tube adapted to extend below the liquid level in the flask. 50 gr. powdered carbon dioxide are added. The carbon dioxide gas acts as a flushing agent to expel oxygen from the reaction. A flow of $CO_2$ is maintained throughout the synthesis except where otherwise indicated. Degassed ethylene glycol (4.0 mols) is added, and the mixture is heated in an 80° C. water-bath until a temperature of 105° C.–107° C. is registered for the ester. When the temperature (partly caused by exothermic heat) starts to drop, the water-bath is replaced by a steam bath at a temperature of 100° C. and maintained there for one half hour. The conversion to the half-ester, ethylene glycol acid-maleate, is quantitative, the acid number being 350, the viscosity 6 poises. However, the half-ester formation

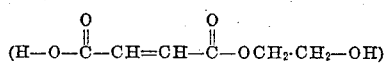

as measured by the acid number may range from 345 to 355.

Step II.—In this step of the process, allyl alcohol is added in about 100% excess (8.0 mols) to the half-ester. In this reaction water of condensation is formed, and to facilitate its removal an azeotropic solvent is added such as toluene (500 cc.), although others such as benzene, or ethylene dichloride may be similarly used. An acid catalyst of esterification (distinguished from an oxidizing catalyst, such as benzoyl peroxide) is also added, for example, 2 grams of para-toluene sulfonic acid, sulfuric acid or hydrochloric acid.

The flask is then fitted with a Stark and Dean trap surmounted by a reflux condenser, so arranged that the upper liquid layer of condensate can be returned to the flask continuously. This layer consists of a solution of the allyl alcohol in the azeotropic solvent. The lower liquid layer will contain the water resulting from esterification of allyl alcohol, and is to be withdrawn continuously. The mixture of half-ester, allyl alcohol, toluene, and catalyst is heated to reflux temperature for esterification, starting at 96° C., and rising thereafter to 110° C. over a period of fifteen hours. During this time, about 90 to about 100 cc. of lower water layer are removed. Carbon dioxide gas is passed through the reaction mixture until the temperature is such that the toluene and alcohol vapors can act as a protective blanket.

The temperature is allowed to drop to about 90° C. at the end of the esterification. Acidity due to the acid catalyst is neutralized by adding to the solution an equivalent amount of alkali-metal hydroxide, e. g. KOH dissolved in ethyl alcohol.

Any excess unreacted allyl alcohol can be distilled over as a constant boiling mixture with toluene. The removal of 500 cc. allyl alcohol-toluene azeotrope requires about one hour; the alcohol comprising about 61.5% of the constant boiling mixture. The flow of carbon dioxide is discontinued during the actual removal, but is continued again when the azeotrope is removed and the temperature is allowed to drop. To aid in removal of the excess allyl alcohol, more toluene may be added and removed in the same manner. The material in the flask is substantially neutral allyl beta-hydroxy-ethyl maleate.

To the ester-alcohol is added 80 mg. of hydroquinone as an inhibitor of polymerization. Toluene (500 cc.) is then added to the solution to maintain a fluid mixture during the addition of phosphorus oxychloride. Zinc chloride (.14 g.) may be added as a dehydrohalogenation catalyst.

The flask is cooled in a bath of crushed ice, and fitted with a dropping funnel containing 1.3 mols of phosphorus oxychloride, which is added dropwise, with stirring, at a temperature of about 10° C.–15° C. in a stream of carbon dioxide. The addition requires approximately one hour. The flask is then evacuated with an aspirator and kept at 10° C. for ten hours to allow for complete reaction and to avoid accumulation of by-product hydrogen chloride in the solution.

The flask is then evacuated to a pressure of 40 mm. Hg, using ethylene oxide as a blanket gas, the temperature used being about 130° C., during one hour. The ethylene oxide is then cut off and the solution cooled under vacuum. The product is a light-colored unsaturated phosphate analyzing:

$C=47\%$
$H=6\%$
$P=5\%$
$Cl=5\%$
Hydroxyl No.=negative
Acid No.=40–80
Sap. No.=727
Viscosity=1–5 poises at room temperature The fact that the hydroxyl number is consistently negative indicates that step II is essentially completed.

The ester is readily polymerizable to a light-colored flameproof resin by heating at 125° C. for a period of thirty minutes in the presence of 1.5% benzoyl peroxide. Addends of basic substances aid in producing a harder cured product.

EXAMPLE 9

Ethyl alcohol (46.1 grams) is added to beta-hydroxy ethyl allyl maleate (400.4 grams) in 500 cc. of toluene. The mixture is cooled to 10° C. with addition of zinc chloride (0.2 gram) and phosphorus oxychloride (153.4 grams). The mixture is permitted to stand fifteen hours at 10° C., then is vacuum treated one hour at 135° C. The product analyzes as follows:

$P=6.2\%$
$C=44\%$
$H=5.35\%$
$Cl=7.4\%$
Acid No.=79
Hydroxyl No.=negative
Sap. No.=691
Mol. wt.=306
Vis., poises=6.3 at 25° C.

Properties of the polymerized resin, after curing at 110° C. twenty minutes using 1.0% benzoyl peroxide:

Barcol impressor hardness=35
Rockwell hardness=94L
Color=dark yellow
Burning resistance=self-extinguishing

EXAMPLE 10

Ethyl alcohol (92.2 grams) is added to beta-hydroxy ethyl allyl meleate (200.2 grams) in 500 cc. of toluene. The mixture is cooled to 10° C.

with addition of zinc chloride (0.2 gram) and phosphorus oxychloride (153.4 grams). The mixture is permitted to stand fifteen hours at 10° C. then is vacuum treated one hour at 135° C. The product analyzed as follows:

P=9.82%
C=44.6%
H=5.35%
Cl=6.1%
Acid No.=147
Hydroxyl No.=negative
Sap. No.=646
Mol. wt.=234
Vis., poises=4.5 at 25° C.

The burning resistance of the polymerized resin after curing at 110° C. 20 minutes using 1.0% benzoyl peroxide is rated as self-extinguishing.

EXAMPLE 11

Methallyl alcohol (180.3 grams) is added to beta-hydroxy ethyl allyl maleate (400.4 grams) with para toluene sulfonic acid (1 gram) in 500 cc. of toluene. The mixture is refluxed four hours, giving off 45 cc. of water and alcohol. The product is treated with phosphorus oxychloride (102.3 grams) at 10° C. After standing fifteen hours at 10° C. the material was treated under vacuum (10 mm.) for one hour at 135° C. The product is a yellow viscous liquid of the following properties:

P=3.06%
Cl=3.43%
Sap. No.=820
Acid No.=209

The monomer cured to a hard resin in two hours at 110° C. in the presence of 1.0% benzoyl peroxide. In resistance to burning, laminates on glass cloth are rated as self-extinguishing.

EXAMPLE 12

Diethylene glycol monomaleate (612.5 grams) is added to allyl alcohol (348.5 grams) para toluene sulfonic acid (1.5 grams), in 600 cc. of xylene. The mixture was heated at reflux for six hours, with the evolution of 75 cc. of water alcohol mixture. Phosphorus oxychloride (153.4 grams) is added to the ester at 10° C. After standing fifteen hours at 10° C. under vacuum the mixture is vacuum treated (20 mm.) at 135° C. for one hour. The product has the following properties:

Cured resins are prepared by heating at 110° C. for one hour in the presence of 1% benzoyl peroxide.

Rockwell hardness=M-104
Barcol hardness=50
Clarity=clear
Color=dark amber
Burning resistance=self-extinguishing While we have shown and described various embodiments of the invention, it is to be understood that the invention is susceptible to other modifications which appear within the spirit of the invention and the scope of the appended claims.

Having thus described our invention, what we claim and desire to protect by Letters Patent is:

1. A polymerizable organic phosphoric acid ester of an ester alcohol having the general formula

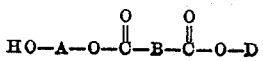

where A is selected from the group consisting of $C_nH_{2n}$— and —$CH_2$—$CH_2$—$(OCH_2CH_2)_m$—; $n$ being an integer from 2 to 5; $m$ being an integer from 1 to 2; B being the residue of an alpha ethylenically-unsaturated dicarboxylic acid selected from the group consisting of

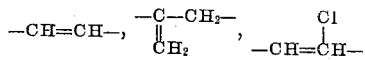

and

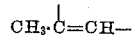

and D being selected from the group consisting of hydrogen and aliphatic hydrocarbon.

2. A product of the formula $(R \cdot O)_3PO$ where R is

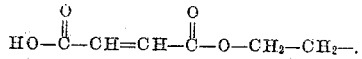

3. A product of the formula $(R \cdot O)_3PO$ where R is

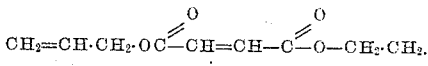

4. A method which comprises reacting phosphorus oxychloride with an ester alcohol having the formula

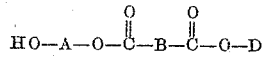

where A is selected from the group consisting of —$C_nH_{2n}$— and —$CH_2$—$CH_2$—$(OCH_2CH_2)_m$—; $n$ being an integer from 2 to 5; $m$ being an integer from 1 to 2; B being the residue of an alpha ethylenically unsaturated dicarboxylic acid selected from the group consisting of

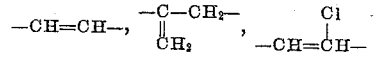

and

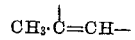

and D being selected from the group consisting of hydrogen and aliphatic hydrocarbon.

5. A product of the formula

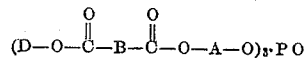

where D is selected from the group consisting of hydrogen and aliphatic hydrocarbon; A is selected from the group consisting of —$C_nH_{2n}$— and —$CH_2$—$CH_2$—$(OCH_2CH_2)_m$—; $n$ being an integer from 2 to 5; $m$ being an integer from 1 to 2; and B is a residue of an alpha ethylenically unsaturated dicarboxylic acid selected from the group consisting of

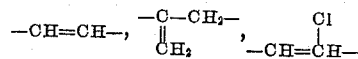

and

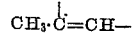

WILLIAM F. BRUCKSCH, Jr.
LOUIS H. HOWLAND.

REFERENCES CITED

The following references are of record in the file of this patent:

UNITED STATES PATENTS

| Number | Name | Date |
|---|---|---|
| 1,970,510 | Ellis | Aug. 14, 1934 |
| 2,379,251 | Muskat | June 26, 1945 |
| 2,384,117 | Muskat | Sept. 4, 1945 |
| 2,394,829 | Whitehill et al. | Feb. 12, 1946 |
| 2,426,691 | Jenkins | Sept. 2, 1947 |
| 2,428,787 | D'Alelio | Oct. 14, 1947 |
| 2,443,740 | Kropa | June 22, 1948 |